United States Patent
Bodin et al.

(10) Patent No.: US 6,217,046 B1
(45) Date of Patent: Apr. 17, 2001

(54) SUSPENSION FOR A NON-DRIVEN STEERABLE VEHICLE WHEEL

(75) Inventors: Jan-Olof Bodin, Alingsås; Ingemar Dagh, Gothenburg, both of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/402,799

(22) PCT Filed: Apr. 9, 1998

(86) PCT No.: PCT/SE98/00665

§ 371 Date: Nov. 2, 1999

§ 102(e) Date: Nov. 2, 1999

(87) PCT Pub. No.: WO98/45157

PCT Pub. Date: Oct. 15, 1998

(30) Foreign Application Priority Data

Apr. 10, 1997 (SE) .................................................. 9701326

(51) Int. Cl.⁷ ....................................................... B62D 7/18
(52) U.S. Cl. ....................................................... 280/93.512
(58) Field of Search ........................................ 280/93.512

(56) References Cited

U.S. PATENT DOCUMENTS

| 4,915,530 | * | 4/1990 | Tomlinson | 280/93.512 |
| 5,413,365 | * | 5/1995 | Bodin et al. | 280/93.512 |
| 5,975,547 | * | 11/1999 | Stroh et al. | 280/93.512 |
| 6,029,986 | * | 2/2000 | Bodin et al. | 280/93.512 |

FOREIGN PATENT DOCUMENTS

| 37 34 503 | 4/1988 | (DE) . |
| WO 97/13674 | 4/1997 | (WO) . |

* cited by examiner

*Primary Examiner*—Kenneth R. Rice
(74) *Attorney, Agent, or Firm*—Young & Thompson

(57) ABSTRACT

Wheel suspension for a non-driven steerable vehicle wheel, comprising a kingpin (3) fixed in a front axle member (1), and having upper and lower bearings (17, 18) by means of which a wheel spindle (12) is pivotable relative to the member. The upper bearing (17) is a taper roller bearing with an inner ring (23), which is made in one piece with a spacer sleeve (24), which is clamped against the member. An elastic sealing ring (29) is held between the spacer sleeve and a surrounding cylindrical surface on the upper spindle ear (13) of the spindle.

7 Claims, 1 Drawing Sheet

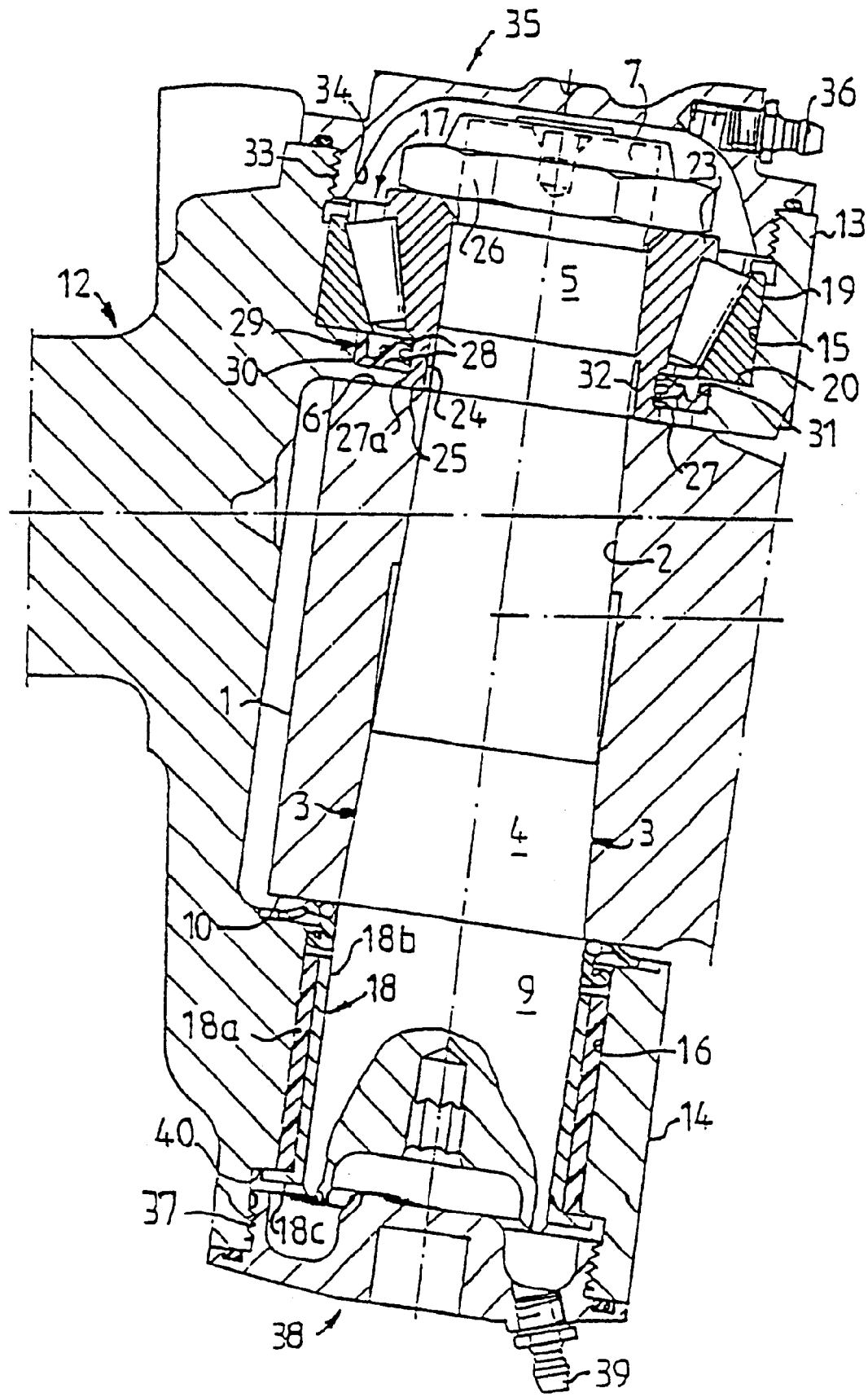

SUSPENSION FOR A NON-DRIVEN STEERABLE VEHICLE WHEEL

The present invention relates to a wheel suspension for a non-driven steerable vehicle wheel, comprising an axle member, which at each end has a conical through-bore, which holds a conical central portion of a kingpin, which is provided with kingpin ends extending outside the bore into the member, and a spindle unit, having, firstly, spaced upper and lower spindle ears holding bearings into which the kingpin ends extend and of which the upper bearing is a roller bearing and the lower bearing is a journal bearing, and, secondly, an axle end on which a wheel hub is intended to be mounted.

The most common type of steering knuckle arrangement for trucks has the spindle unit mounted in a taper roller bearing at the upper end of the kingpin and a journal bearing at its lower end. The upper bearing takes up both axial and radial forces while the lower bearing only takes up radial forces. In such a spindle bearing, the axial force on the upper bearing is load-dependent, i.e. the axial load on the bearing varies with the total weight of the vehicle. When taking a curve, the radial forces on the lower bearing from the kingpin will be such that they strive to tip the lower bearing bushing in its seat in the lower spindle ear. Since the bushing is forced into its seat and the kingpin is mounted with the minimum possible play in the bushing, the bushing cannot even out the force couples which apply an asymmetric load. This results in the upper and lower areas of the bearing race being subjected to radial forces and greater wear than the middle portion, and this in turn can lead to gaps occurring after a relatively short time when driving with heavy loads on winding roads.

The purpose of the present invention is to achieve a wheel suspension of the type described by way of introduction with a lower kingpin bearing which has a longer life than previously known bearings of the type in question.

The purpose of the present invention is to achieve a wheel suspension of the type described by way of introduction, which makes more rapid and simpler assembly possible of the upper roller bearing, so that assembly costs can be appreciably reduced.

This is achieved according to the invention by virtue of the fact that the roller bearing has an inner ring, which is made in one piece with a spacer sleeve having an end surface abutting it a surface fixed relative to the axle member, said surface surrounding the conical bore, and that an elastic sealing ring abuts against an external cylindrical surface on the spacer sleeve and an opposing internal cylindrical surface on the spindle ear.

The embodiment according to the invention permits, after forcing the sealing ring onto the spacer sleeve portion of the bearing inner ring, all of the components in the upper bearing, i.e. the bearing, the spacer sleeve and the seal, to be mounted as a unit, which means that the assembly can be automated with advantage.

The invention presupposes that by making the components with narrower tolerances than previously it is possible to eliminate the need for shims and is based on the fact that increased production costs for the components will in this case be more than compensated for in reduced assembly costs.

In a preferred embodiment, the exterior surface of the spacer sleeve is provided with a peripheral groove so that a radially outwardly directed lower flange is formed, the upwardly facing surface of which, after the sealing ring has been slipped onto the spacer sleeve, serves as an abutment surface and assures that the sealing ring is retained in placed during the assembly of the bearing.

In a further development of the wheel suspension according to the invention, the spacer sleeve has an inner diameter which is greater than the outer diameter of the portion of the kingpin surrounded by the spacer sleeve. This, in combination with suitable adapting of the dimensions of the spacer sleeve to the clamping force makes it possible, with the clamping force, to affect the deformation of the spacer sleeve axially to such an extent that minor tolerance deviations can be compensated for.

The invention will be described in more detail below with reference to an example shown in the accompanying drawing, which shows a longitudinal section through a wheel suspension according to the invention for a truck front wheel.

In the FIGURE, 1 designates one end of a front member in a motor vehicle. The member 1 has a bore 2 of truncated conical shape along most of its length. A kingpin, generally designated 3, with a middle portion 4 with the same conicity as the bore 2, is fixed in the bore. An upper cylindrical kingpin end 5 extends above an upper end surface 6 of the member 1 and has a threaded portion 7 at its very end. A corresponding lower cylindrical kingpin end 9, but without the threaded portion at the very end, extends below a lower end surface 10 on the member 1.

A wheel spindle generally designated 12 has an upper spindle ear 13 and a lower spindle ear 14, which are each made with an individual bearing seat 15 and 16, respectively, for an upper taper roller bearing 17 and a lower journal bearing 18, respectively. The lower journal bearing 18 consists of an outer sleeve 18a of an elastically deformable plastic material and an inner sleeve 18b of a bearing metal. The upper bearing rests with its outer ring 19 against an upwardly facing surface 20 of the upper bearing seat 15. The upper kingpin end 5 protrudes into the inner ring 23 of the upper bearing 17, which is made in one piece with a spacer sleeve 24, which abuts against the upwardly facing surface 6 of the member 1 with an end surface 25. By tightening a nut 26 screwed onto the threaded portion 7, the bearing ring 23 is clamped with its spacer sleeve 24 against the member 1 and is rotationally fixed. The lower kingpin end 9 protrudes into the inner bearing sleeve 18b of the lower journal bearing 18. Its outer sleeve 18a is pressed into the bearing seat 16 in the lower spindle ear 14. The axial position of the bearing 18 in the seat 16 is determined by a flange 18c on the inner bearing sleeve 18b, said flange forming an abutment against an end surface 40 on the lower spindle ear 14.

The outer cylindrical surface of the spacer sleeve 24 is made with a peripheral groove 27, into which the sealing lips 28 on an elastic sealing ring (generally designated 29) extend and abut with their end surfaces against the bottom of the groove 27. The flange 27a formed by the groove 27 forms an abutment which keeps the seal in place during assembly. The portion 30 of the sealing ring 29 opposite the sealing lips 28 has an essentially L-shaped cross sectional profile and is mounted in a seat 31 in the upper spindle ear 13.

As can be seen in the FIGURE, there are no shims between the upwardly facing surface 6 of the member 1 and the end surface of the spacer sleeve 25. This means that the upper bearing 17 with its integrated spacer sleeve 24 and sealing ring 29 mounted thereon, can be directly moved down over the end 5 of the kingpin 3 and the end surface 25 of the spacer sleeve will be brought into abutment against the member surface 6 and the end surface of the outer ring 19 will be brought into abutment with the upwardly facing surface 20 of the bearing seat 15. The bearing assembly, as well as the subsequent screwing on and tightening of the nut 26 can be done with advantage by a robot.

The bearing design described presupposes manufacture with narrow tolerances. A certain evening out of minor tolerance deviations can be achieved by axial deformation of the spacer sleeve 24 by tightening the nut 26. In order to provide space for the radial expansion which accompanies axial compression of the spacer sleeve 24, it has a somewhat greater inner diameter than the outer diameter of the surrounded kingpin portion, so that a gap 32 is formed.

The upper spindle ear 13 has an inner threaded portion 33 above the bearing seat 15, into which an externally threaded flange 34 on a cover 35 is screwed in, so that a space sealed off by the sealing ring 29 and the cover 35 is formed for lubricant. The cover 35 is provided with a laterally directed grease nipple 36. The entry point of the thread is selected so that the grease nipple 36, after the cover 35 has been screwed down, will assume a predetermined position in which it is easily accessible during service. The lower spindle ear 14 has a corresponding internally threaded portion 37, into which an externally threaded cover 38 with a grease nipple 39 is screwed.

What is claimed is:

1. Wheel suspension for a non-driven steerable vehicle wheel, comprising an axle member, which at each end has a conical through-bore, which holds a conical central portion of a kingpin which is provided with kingpin ends extending outside the bore into the member, and a spindle unit, having, firstly, spaced upper and lower spindle ears, holding bearings into which the kingpin ends extend and of which at least the upper bearing is a roller bearing, and, secondly, an axle end on which a wheel hub is intended to be mounted, characterized in that the roller bearing (17) has an inner ring (23), which is made in one piece with a spacer sleeve (24) having an end surface (25) abutting against a surface (6) fixed relative to the axle member (1), said surface (6) surrounding the conical bore (2), and that an elastic sealing ring (29) abuts against an external cylindrical surface on the spacer sleeve and an opposing internal cylindrical surface (31) on the spindle ear.

2. Wheel suspension according to claim 1, characterized in that the end of the spacer sleeve (24) facing the axle member surface (6) is made with a radially outwardly directed flange (27a) forming an abutment surface facing the sealing ring (29).

3. Wheel suspension according to claim 2, characterized in that said abutment surface forms one side surface of a groove, in the spacer sleeve (24), for the sealing ring (29).

4. Wheel suspension according to claim 1, characterized in that the spacer sleeve (24) has an inner diameter which is greater than the outer diameter of the portion of the kingpin (3) surrounded by the spacer sleeve.

5. Wheel suspension according to claim 3, characterized in that the sealing ring (29) has a radially outer cylindrical portion, which is held in a seat in the upper spindle ear and at least one radially inwardly directed sealing lip (28), which abuts against the bottom surface of the groove.

6. Wheel suspension according to claim 2, characterized in that the spacer sleeve (24) has an inner diameter which is greater than the outer diameter of the portion of the kingpin (3) surrounded by the spacer sleeve.

7. Wheel suspension according to claim 4, characterized in that the sealing ring (29) has a radially outer cylindrical portion, which is held in a seat in the upper spindle ear and at least one radially inwardly directed sealing lip (28), which abuts against the bottom surface of the groove.

* * * * *